(12) United States Patent
Nunez

(10) Patent No.: US 8,534,308 B2
(45) Date of Patent: Sep. 17, 2013

(54) PRESSURE CONTROL AND RELIEF SYSTEM

(75) Inventor: Mario Nunez, Chicago, IL (US)

(73) Assignee: Delaware Capital Formation, Wilmington, DE (US)

( * ) Notice: Subject to any disclaimer, the term of this patent is extended or adjusted under 35 U.S.C. 154(b) by 331 days.

(21) Appl. No.: 12/658,453

(22) Filed: Feb. 4, 2010

(65) Prior Publication Data
US 2011/0079292 A1 Apr. 7, 2011

Related U.S. Application Data

(63) Continuation-in-part of application No. 12/587,280, filed on Oct. 5, 2009.

(51) Int. Cl.
*F16K 17/14* (2006.01)
*F16K 17/40* (2006.01)
*B65D 90/34* (2006.01)

(52) U.S. Cl.
USPC .................. 137/71; 137/68.23; 220/89.2

(58) Field of Classification Search
USPC ................. 137/71, 68.23; 220/89.2
See application file for complete search history.

(56) References Cited

U.S. PATENT DOCUMENTS

| | | | |
|---|---|---|---|
| 1,306,150 A | 6/1919 | Kessler | |
| 1,432,216 A | 10/1922 | Steinmeyer | |
| 1,511,610 A | 10/1924 | Holmes | |
| 1,698,616 A | 1/1929 | Woodham | |
| 2,079,164 A * | 5/1937 | Glab | 137/69 |
| 2,098,399 A * | 11/1937 | Munson | 220/89.2 |
| 2,526,795 A * | 10/1950 | Andrews | 220/89.2 |
| 2,831,500 A | 4/1958 | Fennema et al. | |
| 2,922,544 A | 1/1960 | Hibbard et al. | |
| 3,485,082 A * | 12/1969 | Myers | 73/1.72 |
| 3,587,634 A | 6/1971 | Krause | |
| 3,872,875 A | 3/1975 | Raidl, Jr. | |
| 5,150,880 A | 9/1992 | Austin, Jr. et al. | |
| 5,465,753 A | 11/1995 | Schwartz | |
| 5,513,767 A | 5/1996 | Daehn | |
| 5,673,897 A | 10/1997 | Crochet et al. | |
| 5,782,259 A | 7/1998 | Ledbetter et al. | |
| 5,887,567 A * | 3/1999 | White et al. | 123/294 |
| 5,941,268 A | 8/1999 | Ross, Jr. | |
| 6,431,196 B1 | 8/2002 | Brazier et al. | |
| 6,668,853 B2 * | 12/2003 | Dean | 137/315.04 |
| 2007/0102041 A1 | 5/2007 | Poulter | |
| 2007/0116546 A1 | 5/2007 | Dearing | |

OTHER PUBLICATIONS

International Search Report dated Mar. 28, 2011; 10 pgs.
International Preliminary Report on Patentability, dated Aug. 7, 2012; 1 page.
PCT Written Opinion of the International Searching Authority, dated Mar. 28, 2011; 4 pages.

\* cited by examiner

*Primary Examiner* — John Rivell
*Assistant Examiner* — Daphne M Barry
(74) *Attorney, Agent, or Firm* — Seyfarth Shaw LLP

(57) ABSTRACT

A pressure control system for controlling pressure in a tank is provided. The pressure control system includes a base plate, a pressure relief valve, a rupture disc, a first connector and a second connector. The base plate includes a tank side and a valve side. The pressure relief valve includes a body and a connection portion for coupling the pressure relief valve to the base plate adjacent the valve side. The rupture disc is positioned between the pressure relief valve and the base plate. The first connector extends between the base plate and the pressure relief valve to secure the pressure relief valve to the base plate and secure the rupture disc. The second connector is positioned for securing the base plate to the tank.

15 Claims, 6 Drawing Sheets

PRESSURE CONTROL AND RELIEF SYSTEM

RELATED APPLICATIONS

The present application is a continuation-in-part of U.S. Ser. No. 12/587,280, filed on Oct. 5, 2009, the filing priority of which is claimed and the entire disclosure of which is hereby incorporated by reference.

FIELD OF THE INVENTION

This invention relates generally to pressure control and relief systems, and in more particular applications to pressure relief valve systems including rupture discs.

BACKGROUND

Valves and valve systems are used to control pressure within containers and flow into and out of containers. Further, valves can be used to prevent overpressure situations from occurring. For example, a container may be overfilled such that fluid may potentially rupture the container. Similarly, a tank may be filled to an appropriate level, but as the temperature rises, the pressure within the tank may also rise, thereby causing an overpressure situation. In this manner, an overpressure valve may be used to slowly release fluid and prevent the container from rupturing. Additionally, rupture discs may also be included in such a valve system to prevent fluid from contacting the pressure relief valve until an overpressure condition exists.

Such valves and valve systems can be utilized in a number of applications. For example, these valve systems are often used in rail cars for transporting fluids, including liquids and/or gas. Generally, rail cars include at least one location on the car where inlet and outlet valves may be located, along with other related devices, such as pressure control valves, gauges and other structures. However, generally these valves, including pressure relief valves, are often located on an exterior of the rail car. By having the valves located on the exterior of the rail car, the valves are more prone to being damaged and/or accidentally removed if contacted by other machinery or if the rail car were to overturn.

Valves, including overpressure valves, are also used on other containers such as ISO and tote tanks. In general, an ISO tank is a pressure vessels mounted in a frame that complies with the standards of the International Standards Organization (ISO). ISO and tote tanks are commonly used for transporting chemicals, especially internationally. In some instances, these types of tanks are approximately one quarter the size of rail cars. Additionally, the tanks are built with frames or other structural support surrounding the tank to protect the tank and allow it to sit squarely on the ground or on top of other tanks. These types of tanks can be transported in a number of ways, including, but not limited to, rail, truck and sea.

ISO and tote tanks generally include similar valves and valve systems to those described with respect to rail cars. For example, ISO and tote tanks may include overpressure valves and/or rupture discs for preventing the tanks from rupturing during an overpressure situation. Just as described with respect to rail cars, ISO and tote tanks are also susceptible to tipping over and/or having the valves damaged or broken off by other machinery.

Furthermore, typical pressure relief valves and rupture discs are often interconnected such that if one component requires servicing or replacement, the entire system must be removed. This can be problematic, especially if the tank contains fluid that must be drained prior to removal or servicing of the system.

SUMMARY

In one form, a pressure control system for controlling pressure in a tank is provided. The pressure control system includes a base plate, a pressure relief valve, a rupture disc, a first connector and a second connector. The base plate includes a tank side and a valve side. The pressure relief valve includes a body and a connection portion for coupling the pressure relief valve to the base plate adjacent the valve side. The rupture disc is positioned between the pressure relief valve and the base plate. The first connector extends between the base plate and the pressure relief valve to secure the pressure relief valve to the base plate and secure the rupture disc. The second connector is positioned for securing the base plate to the tank.

According to one form, a method for assembling a pressure control system for controlling pressure in a tank is provided. The method includes the steps of: providing a base plate having a tank side and a valve side; providing a pressure relief valve having a body and a connection portion; positioning a rupture disc between the connection portion of the pressure relief valve and the valve side of the base plate; and securing the pressure relief valve and rupture disc to the valve side of the base plate by extending a first connector between the base plate and the pressure relief valve.

In one form, the first and second connectors are independently secured to the base plate.

According to one form, the pressure control system further includes a plurality of first connectors and a plurality of second connectors.

In accordance with one form, the second connectors do not extend through the rupture disc.

In one form, the second connectors extend from the tank side of the base plate.

According to one form, the second connectors extend from the valve side of the base plate.

In accordance with one form, the tank is a rail car tank.

In one form, the tank is an ISO tank.

According to one form, the tank is a tote tank.

In accordance with one form, the pressure control valve and rupture disc subassembly are located within a valve cover assembly.

Other forms are also contemplated as understood by those skilled in the art.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its constructions and operation, and many of its advantages should be readily understood and appreciated.

Figure 1:
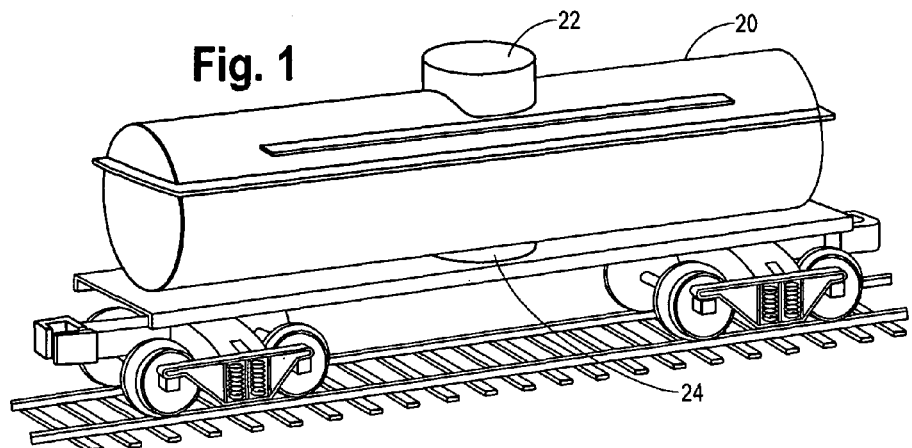
FIG. 1 is a perspective view of a rail car with valves located within a tank car cover.

Various figures are presented to further aid one skilled in the art in understanding the various forms of the pressure control and relief system. However, the present invention should not be construed to be limited to the forms depicted in the figures and described herein.

DETAILED DESCRIPTION

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to embodiments illustrated.

Figure 2:
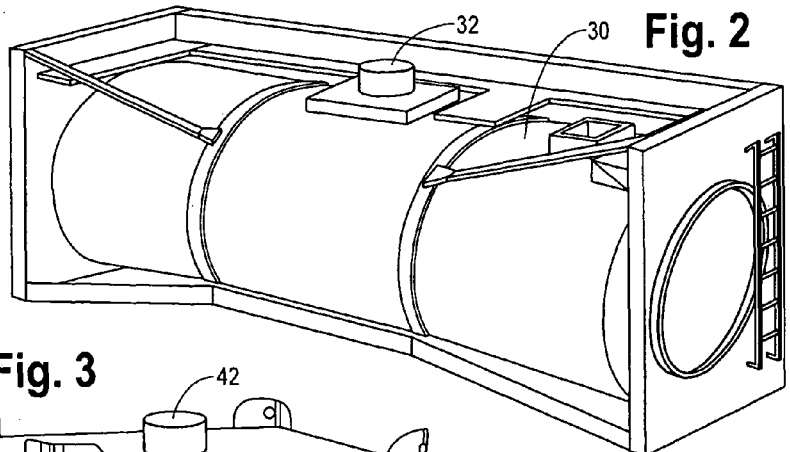
FIG. 2 is a perspective view of an ISO tank with valves located within a valve cover.
Figure 3:
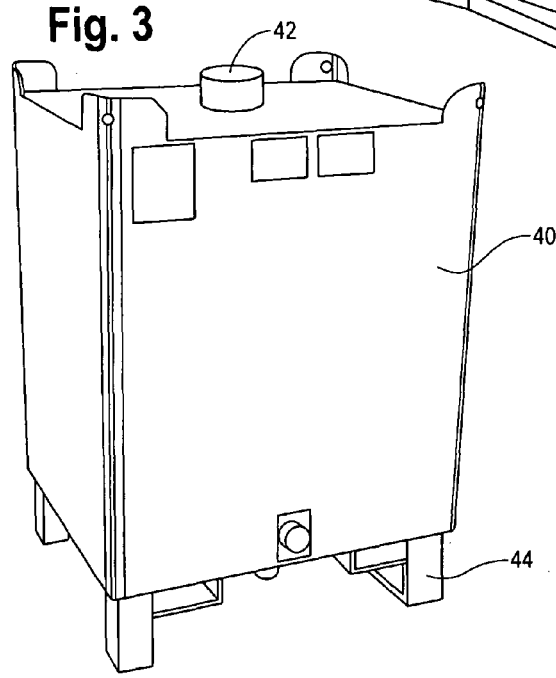
FIG. 3 is a perspective view of a tote tank with valves located within a valve cover.

Referring to FIGS. 1-3, various containers are illustrated. For example, referring to FIG. 1, a rail car 20 is illustrated. The rail car 20 can be used to transport fluids via rail, and more particularly, may be suitable for transporting large volumes of fluids. The rail car 20 includes a cover 22 which can be used to cover various structures and devices, including, but not limited to, valves, gauges, inlets, outlets and other structures. The structures contained under the cover 22 will be explained in more detail below.

Further, the rail car 20 may include other structures as understood by those skilled in the art. For example, the rail car may include a lower cover 24 to contain additional structures similar to those described above. Specifically, the lower cover 24 may contain additional inlets, outlets, valves and gauges. Other features of the rail car 20 will not be discussed herein for the sake of brevity but should be readily understood by those skilled in the art.

Referring now to FIG. 2, an ISO tank 30 is illustrated. The ISO tank 30 include's a cover 32 which can be used to cover various structures and devices, including, but not limited to, valves, gauges, inlets, outlets and other structures. The structures contained under the cover 32 will be explained in more detail below. Generally, the ISO tank 30 is used to transport slightly smaller volumes of fluid and/or may be used for transporting fluids internationally. Additionally, ISO tanks generally include external framework or support 34 to provide extra strength to the tank 30 and also permit the tank 30 to sit squarely on a surface or another tank. Other features of the ISO tank 30 will not be discussed herein for the sake of brevity but should be readily understood by those skilled in the art.

A tote tank 40 is illustrated in FIG. 3. The tote tank 40 includes a cover 42 which can be used to cover various structures and devices, including, but not limited to, valves, gauges, inlets, outlets and other structures. The structures contained under the cover 42 will be explained in more detail below. Generally, the tote tank 40 is used to transport slightly smaller volumes of fluid and/or may be used for transporting fluids internationally. Additionally, tote tanks generally include supports 34 to provide extra strength to the tank 40 and also permit the tank 40 to sit squarely on a surface or another tank. Other features of the tote tank 40 will not be discussed herein for the sake of brevity but should be readily understood by those skilled in the art.

Figure 4:
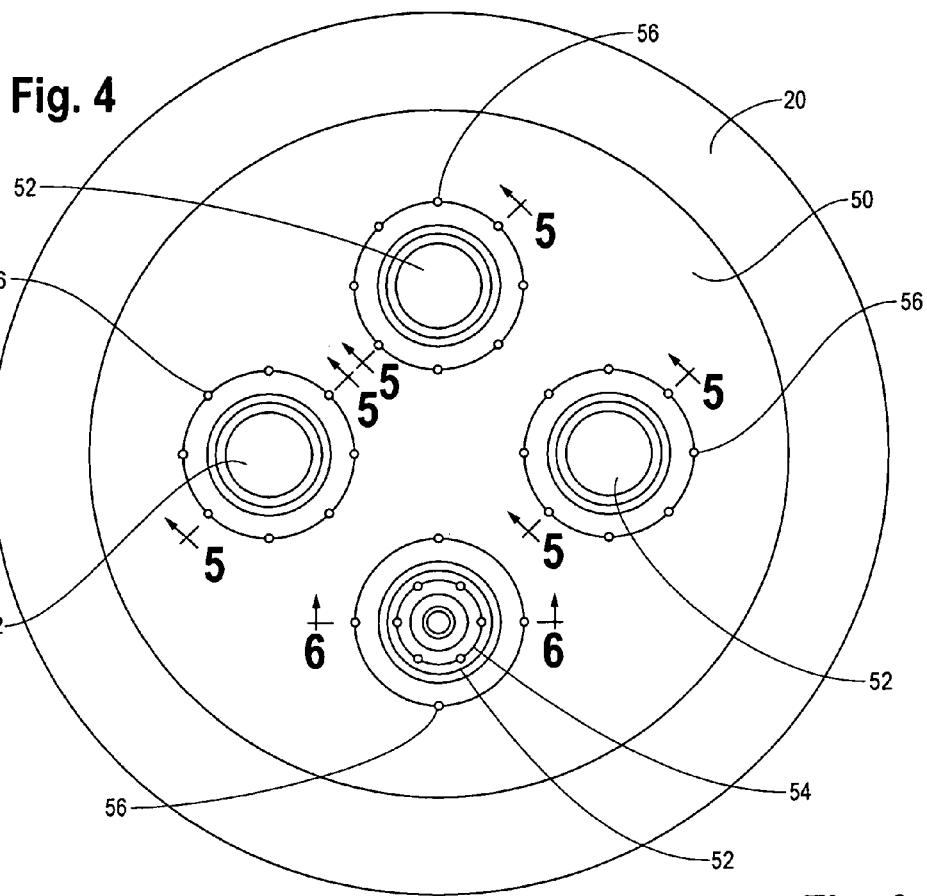
FIG. 4 is a top view of a tank plate with various openings and valve ports.

Referring now to FIG. 4, a plate 50 is illustrated. The plate 50 generally is located beneath a cover for a tank. For example, the plate 50 shown in FIG. 4 is located on the rail car 20 beneath the cover 22. However, it should be understood that the plate 50 may similarly be located on the ISO tank 30 or tote tank 40 or any other suitable tank. Furthermore, it should be understood that the plate 50 need not be enclosed within a cover, but may instead be exposed. Additionally, the plate 50 may also be formed as an integral part of the tank 20 or may be a separate component affixed to the tank 20, as understood by those skilled in the art.

Figure 5:
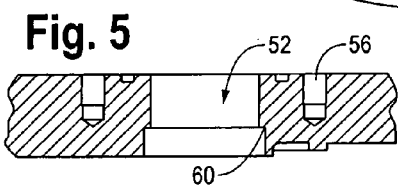
FIG. 5 is a cross-sectional view of an opening taken along line 5-5 of FIG. 4.

The plate 50 may include any number of openings 52. The openings 52 can be used to install valves, gauges, inlets, outlets and the like. For example, as shown in FIG. 5, a rupture disc subassembly 54 is installed in one of the openings 52. Generally, when the tank 20 is in operation to transport fluid, the remaining openings 52 will have valves, gauges or the like or will otherwise be sealed off so as to contain the fluid within the tank 20. In this regard, mounting holes 56 are generally located around the periphery of the openings 52 so as to provide locations for connectors (not shown). It should be understood that any number of mounting holes 56 may be included and further, that other forms of mounting structures besides mounting holes 56 may be used with the openings 52.

Figure 6:
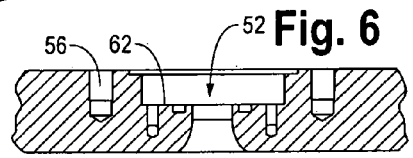
FIG. 6 is a cross-sectional view of an opening taken along line 6-6 of FIG. 4.

Further, as best seen in FIGS. 5 and 6, the openings 52 may include different shapes and sizes as desired for different types of valves, gauges and the like. For example, the opening 52 shown in FIG. 5 may be shaped and sized to receive an angle valve and check valve assembly while the opening in FIG. 6 may be shaped and sized to receive a rupture disc subassembly and a pressure relief valve. Further, it should be understood that the openings 52 may include beveled edges 60, recessed areas 62 and other structures and features depending on the type of valve, gauge or other structure coupled to the opening 52.

Figure 7:
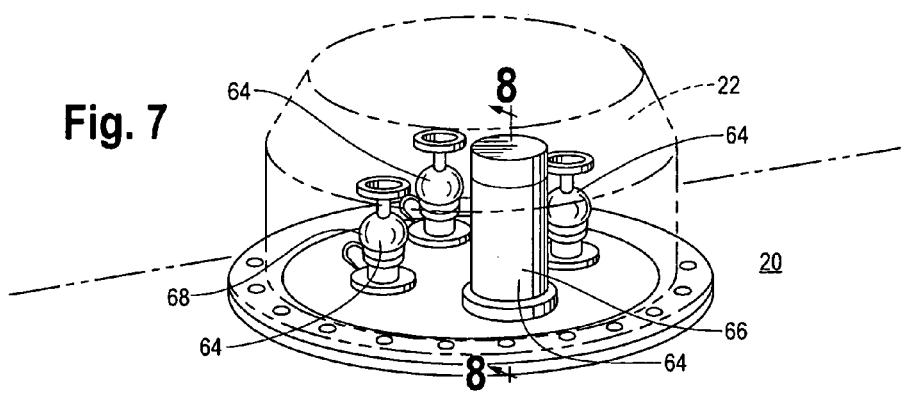
FIG. 7 is a top perspective view of valves installed in a tank plate with a valve cover shown in phantom.

Referring now to FIG. 7, one embodiment of the tank 20 is illustrated with a number of valves 64 installed, including a pressure control system 66 and an angle valve 68. As shown in this figure, when in operation, this embodiment includes the cover 22, shown in phantom, for covering the valves 64 and providing additional protection. However, this cover 22 can be opened when desired to have direct access to the valves 64.

The details of the operation and installation of the pressure control system 66 will now be discussed in more detail. While this system 66 will be discussed as being installed on the tank 20, it should be understood by those skilled in the art that the system 66 can be installed on the ISO tank 30, tote tank 40 and other tanks.

Figure 8:
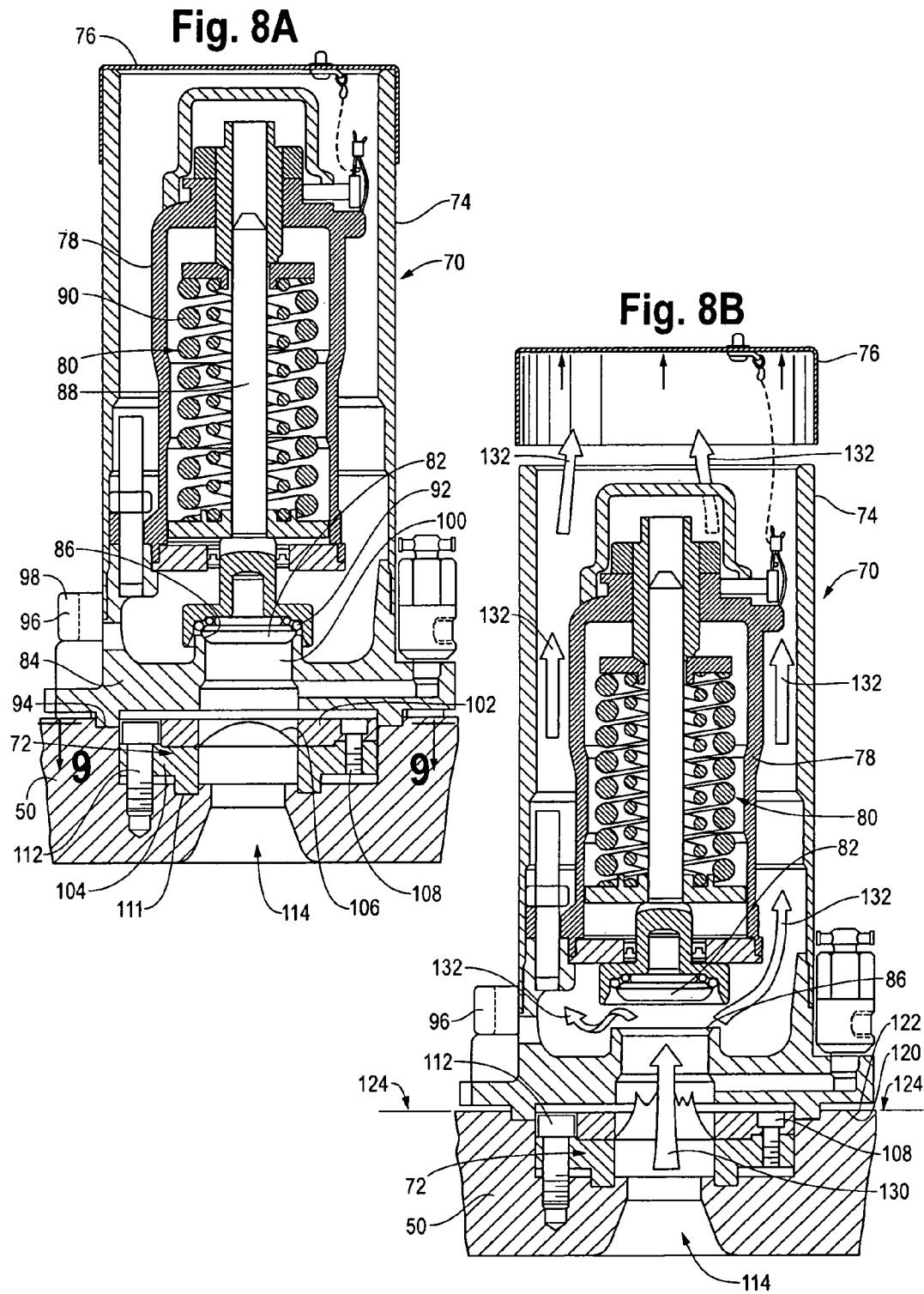
FIG. 8A is a cross-sectional view of the valve system illustrated in FIG. 7 in a first configuration.
FIG. 8B is a cross-sectional view of the valve system illustrated in FIG. 7 in a second configuration.
Figure 9:
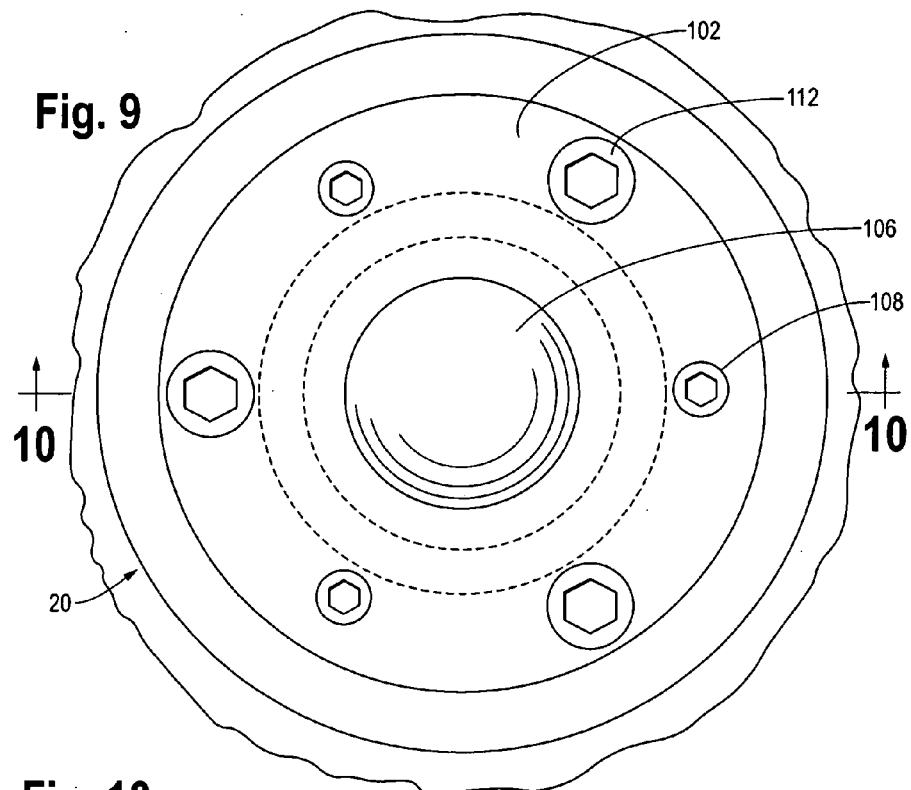
FIG. 9 is a top view of a rupture disc subassembly installed in a tank plate.

Referring to FIG. 8A, a cross-sectional view of the pressure control system 66 is illustrated. In one form, the pressure control system 66 includes a pressure relief valve 70 and a rupture disc subassembly 72. The pressure control system 66 may also include an exterior body 74 and a cover 76 which can be used to substantially enclose the pressure relief valve 70.

The pressure relief valve 70 generally includes an enclosure 78, a biasing assembly 80, a valve 82, a base 84, a valve seat 86, a valve stem 88 and other components understood by those skilled in the art. The base 84 includes a valve seat 86 which the valve 82 can seal against to maintain pressure. The valve stem 88 extends from the valve 82 and cooperates with the biasing assembly 80 to bias the valve 82 to a closed position. In one form, the biasing assembly includes one or more springs 90 to bias the valve 82. Further, the enclosure 78 can be used to enclose the biasing assembly 80 and valve stem 88. The pressure relief valve 70 may also include other components and features such as gaskets 92 to help seal the valve and a mounting portion 94 located at the base 84 to help provide a secure mounting point between the valve 70 and the tank 20. In this regard, in one form, the pressure relief valve 70 includes valve connectors 96, such as bolts 98 to secure the pressure relief valve 70 to the tank 20. However, it should be understood that other connectors may also be used. Further, the pressure relief valve 70 includes a fluid flow path 100 whereby fluid can flow through the pressure relief valve 70.

Figure 10:
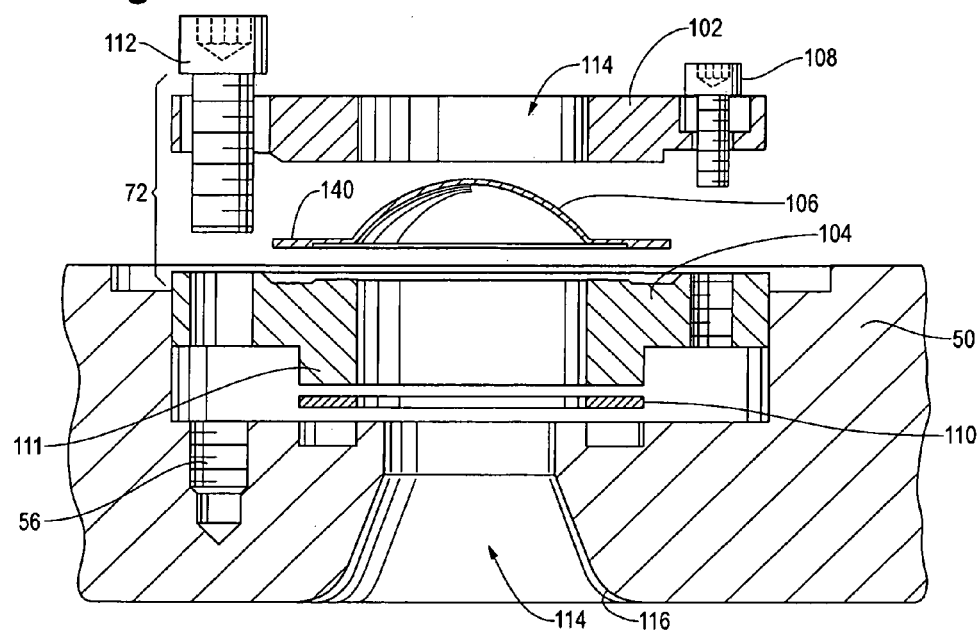
FIG. 10 is an exploded, cross-sectional view of the rupture disc subassembly taken along line 10-10 of FIG. 9.

As best seen in FIG. 10, the rupture disc subassembly 72 includes a first securing plate 102, a second securing plate 104, a rupture disc 106 and plate connectors 108. The first and second securing plates 102,104 and plate connectors 108 are used to secure the rupture disc 106. While the embodiment illustrated in FIG. 10 has two securing plates 102,104 and connectors 108, it should be understood that the rupture disc 106 can be secured in other manners as understood by those skilled in the art. The rupture disc 106 can be a conventional rupture disc known by those skilled in the art such that the rupture disc 106 will maintain pressure up to a desired pressure, but will break or otherwise lose its seal when the pressure exceeds the desired pressure. The rupture disc 106 can be made from appropriate materials as desired and as necessary for the respective fluids being transported in the tank 20. The subassembly 72 may also include a gasket 110, mounting portion 111 and one or more subassembly connectors 112 for coupling the subassembly 72 to the plate 50 and/or the tank 20. Further, the subassembly 72 defines a fluid flow path 114 for permitting fluid to flow when the seal at the rupture disc 106 is broken during an overpressure condition. The subassembly 72 may also optionally include a curved edge 116 to help fluid flow through the fluid flow path 114 during an overpressure condition.

It should be understood that the subassembly 72 may be assembled prior to installation on the plate 50 and/or the tank 20. Generally, the rupture disc 106 will be sandwiched between the first and second securing plates 102,104 which will be held in place by the plate connectors 108. The subassembly 72 can then be installed on the plate 50 and/or the tank 20 and may use the optional gasket 110 to help provide a fluid tight seal. As best seen in FIGS. 8A,B, the subassembly 72 is connected to the plate 50 substantially on an inner side 120 of an outer surface 122 of the plate 50 using the subassembly connectors 112 which are positioned in the respective mounting holes 56. It should be understood that when installed, the subassembly 72 is located substantially at or below a plane 124 defined by the outer surface 122 of the plate 50 and/or the tank 20. Furthermore, it should be understood that the rupture disc subassembly 72 may be located substantially within the thickness of the exterior surface of the plate 50 and/or the tank 20.

Once the subassembly is installed, the pressure relief valve 70 can be installed on the tank 20. The pressure relief valve 70 is installed over the rupture disc subassembly 72 using the connectors 96 and may include gaskets to help provide a fluid tight seal. In one form, once the pressure relief valve 70 is installed, it can still be maintained while fluid is in the tank 20. Specifically, the enclosure 74 can be removed while the pressure relief valve 70 is still installed on the tank. Alternatively, the pressure relief valve 70 can be removed while the rupture disc subassembly 72 is retained in place on the tank 20.

The operation of the pressure control system 66 would be generally understood by those skilled in the art in view of the drawings and descriptions provided herein. However, a brief overview will be presented for clarity. Referring to FIG. 8A, the pressure control system 66 is shown in a sealed condition whereby no fluid is permitted to exit the system 66. The pressure control system 66 is shown in FIG. 8B in a pressure relief condition, which would likely result from an overpressure condition. In the pressure relief condition, it can be seen that the rupture disc 106 has broken whereby fluid is traveling through the flow path 114, as illustrated by arrow 130. If the pressure in the tank 20 is large enough, it will provide sufficient force to open the valve 82, against the force of the biasing assembly 80. In this regard, fluid will flow out of the pressure relief valve 70, as illustrated by arrows 132. Furthermore, the pressure relief valve 70 may operate such that the valve 82 repeatedly opens and closes as the biasing assembly 80 biases the valve 82 back towards the closed condition.

It should be understood that, in one form, because the rupture disc subassembly 72 is a separate component from the pressure relief valve 70 using separate connectors, the entire pressure relief valve 70 can be removed and replaced or maintained as desired. In this regard, the contents of the tank 20 do not need to be removed when the pressure relief valve 70 is changed or maintained. Also, when in operation, if the tank 20 were to turn over, the pressure relief valve 70 might become sheared off the tank 20. If this were to occur, the rupture disc assembly 72 would likely remain in place and secure as it is substantially located at or below the outer surface 122 of the plate 50. Furthermore, because the rupture disc subassembly 72 is coupled to the tank 20 via separate connectors 112 than the pressure relief valve 70, even if the pressure relief valve 70 connectors 98 were also sheared off, the rupture disc 72 would likely remain in place and secure because of the connectors 112. Therefore, fluid would be prevented from inadvertently leaking out of the pressure control system 66 if the pressure relief valve 70 were sheared off or otherwise removed.

Furthermore, in one form, the installation and connection of the pressure relief valve 70 and rupture disc subassembly 72 helps prevent localized high pressure points on the rupture disc 106. These localized high pressure points can cause premature failure of the rupture disc 106. As shown in FIG. 10, the rupture disc 106 includes an outer periphery 140 which is sandwiched between the securing plates 102,104. In typical assemblies where the rupture disc is affixed to the pressure relief valve, the connection of the pressure relief valve can cause localized high pressure points on the outer periphery adjacent to the bolts connecting the pressure relief valve to the tank. This is generally because the pressure relief valve connectors tend to be large and require significant torque to secure the pressure relief valve. In the forms illustrated in the figures, the rupture disc subassembly 72 is coupled to the tank 20 via separate connectors 112 than the connectors 96 for the pressure relief valve 70. Therefore, the only pressure on the rupture disc 106 is from the connectors 108 and 112. The torque on these connectors 108 and 112 can be set as desired for the rupture disc 106, independent of the torque required to secure the pressure relief valve 70 to the tank 20.

Further forms of a control system 200 having a pressure relief valve 202 and rupture disc 204 are illustrated in FIGS. 11-13B. The primary difference between the forms illustrated in FIGS. 11-13B and those previously described in FIGS. 8A-10 is in the design and attachment of the rupture disc 202. For example, the forms illustrated in FIGS. 11-13B generally have the rupture disc 204 connected to the pressure relief valve 202. It should be understood that the forms shown in FIGS. 11-13B include a number of the same components as the forms described in FIGS. 8A-10, and therefore, will include the same reference numbers where appropriate.

The control system 200 includes the pressure relief valve 202, the rupture disc 204, and a base plate 206. The system 200 also includes first connectors 208 extending between the base plate 206 and the pressure relief valve 202 to secure the pressure relief valve 202 to the base plate 206 and secure the rupture disc 204. The system 200 further includes one or more second connectors 210 for securing the base plate 206 to the tank.

The base plate 206 has a tank side 212 and a valve side 214. The pressure relief valve 204 includes a body 216 and a connection portion 218 for coupling the pressure relief valve 202 to the base plate 206 adjacent the valve side 214.

Figure 11:
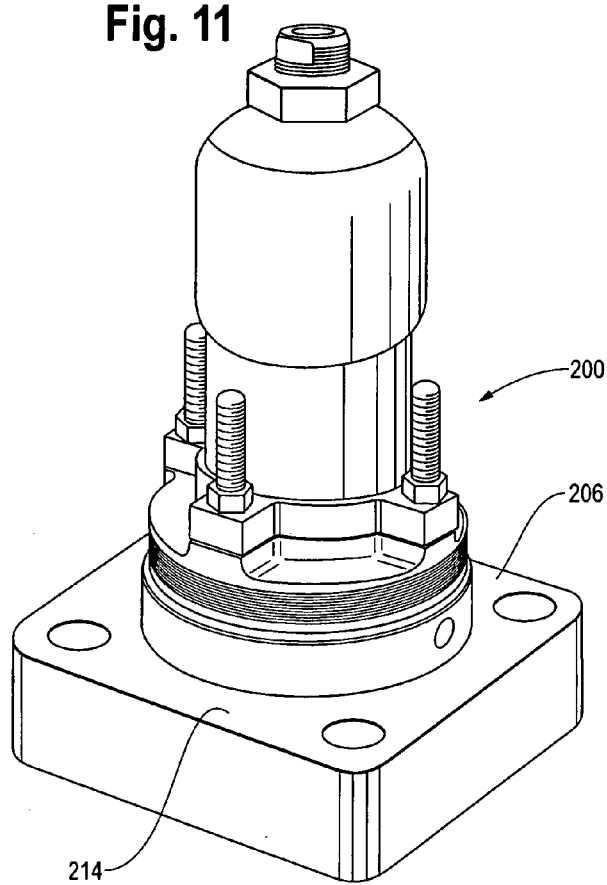
FIG. 11 is a top perspective view of a valve system without an exterior body.
Figure 12:
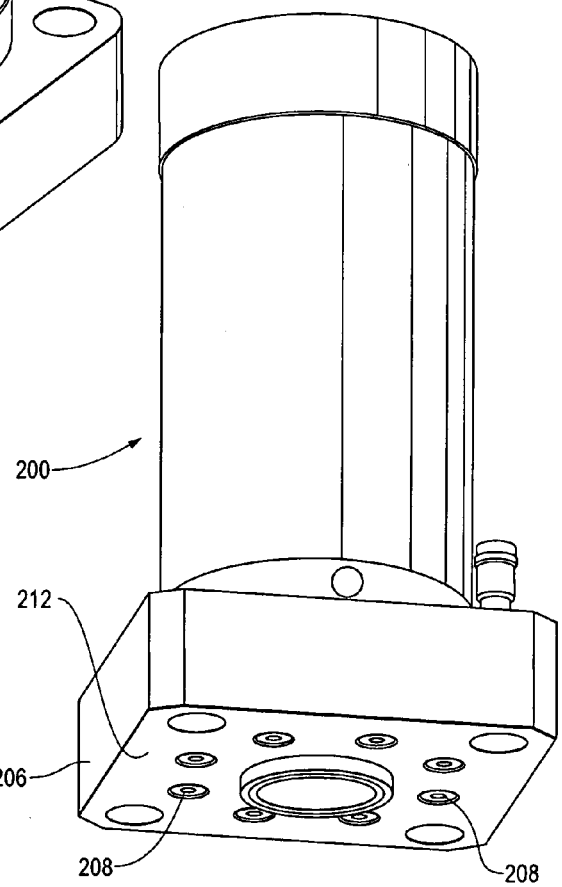
FIG. 12 is a bottom perspective view of a valve system with an exterior body installed.
Figure 13A:
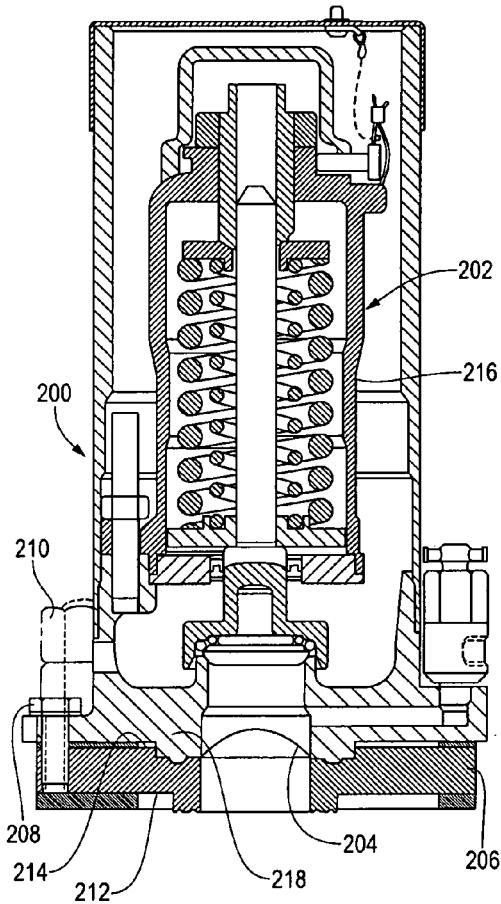
FIG. 13A is cross-sectional view of a valve system in a first configuration.
Figure 13B:
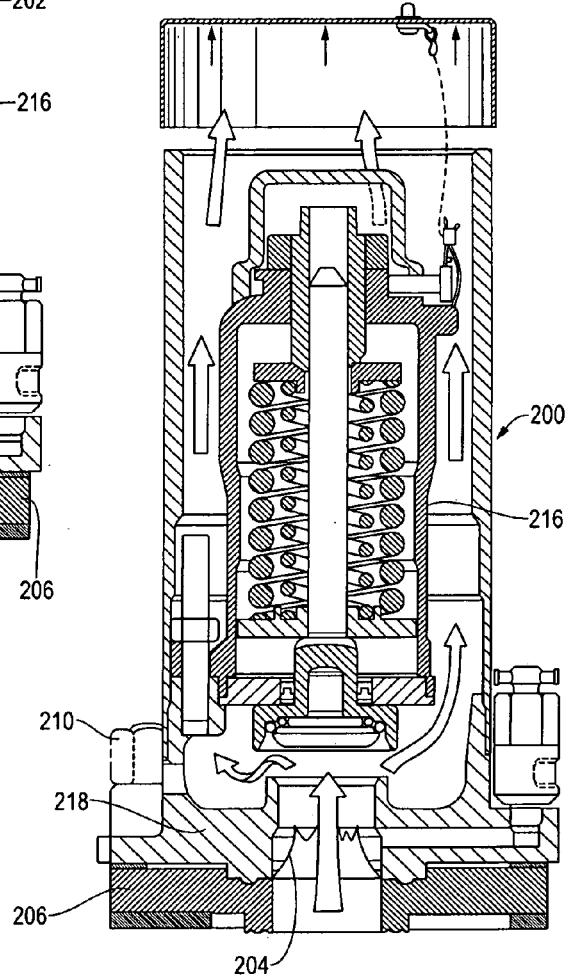
FIG. 13B is a cross-sectional view of a valve system in a second configuration.

As shown in the embodiments in FIGS. 11 and 12, the first connectors 208 are positioned from the tank side 212 of the base plate 206 and extend therethrough. In another form, such as best seen in FIG. 13A, the first connectors 208 instead are positioned at the connection portion 218 of the pressure relief valve 202 and extend therethrough. The second connectors 210, on the other hand, extend through the base plate 206 to connect to the tank. Any number and orientation of first and second connectors 208 and 210 may be used as understood by those skilled in the art.

It should also be noted that the first and second connectors 208 and 210, in one form, are independently secured to the base plate such that the system 200 can be substantially assembled prior to installation on a tank and to promote proper compression of the rupture disc 204. Moreover, in one form, none of the first and second connectors 208 and 210 extend through any portion of the rupture disc 204.

The matter set forth in the foregoing description and accompanying drawings is offered by way of illustration only and not as a limitation. While particular embodiments have been shown and described, it will be obvious to those skilled in the art that changes and modifications may be made without departing from the broader aspects of applicants' contribution. The actual scope of the protection sought is intended to be defined in the following claims when viewed in their proper perspective based on the prior art.

The invention claimed is:

1. A pressure control system for controlling pressure in a tank, the pressure control system comprising:
   a base plate having a tank side and a valve side;
   a pressure relief valve having a body and a connection portion disposed adjacent to the valve side;
   a rupture disc disposed between the pressure relief valve and the base plate; and
   a first bolt extending through the connection portion and into the base plate to couple the pressure relief valve to the base plate and compress the rupture disc between the pressure relief valve and the base plate, thereby forming an assembly including the base plate and the pressure relief valve with the rupture disc compressed between the pressure relief valve and the base plate before installation of the assembly on the tank;
   wherein the assembly is coupled to the tank with a second bolt, independent of the first bolt, extending through the base plate and into a wall of the tank.

2. The pressure control system of claim 1 wherein the first bolt extends from the tank side.

3. The pressure control system of claim 1 wherein the first bolt extends from the valve side.

4. The pressure control system of claim 1 wherein the tank is a rail car tank.

5. The pressure control system of claim 1 wherein the tank is an ISO tank.

6. The pressure control system of claim 1 wherein the tank is a tote tank.

7. The pressure control system of claim 1 wherein the pressure control valve and rupture disc are disposed within a valve cover assembly.

8. A method for controlling pressure in a tank, the method comprising:
   providing a base plate having a tank side and a valve side;
   providing a pressure relief valve having a body and a connection portion;
   disposing a rupture disc between the connection portion and the valve side; coupling the pressure relief valve to the valve side and compressing the rupture disc between the connection portion and the valve side by extending a first bolt through the connection portion of the pressure relief valve and into the base plate, thereby forming an assembly with the rupture disc compressed between the pressure relief valve and the base plate before installation of the assembly on the tank; and
   coupling the assembly to the tank by extending a second bolt, independent of the first bolt, through the base plate and into a wall of the tank.

9. The method of claim 8 further comprising:
   extending a plurality of first bolts through the connection portion; and
   extending a plurality of second bolts through the base plate.

10. The method of claim 8 wherein the first bolt extends from the tank side to the pressure relief valve.

11. The method of claim 8 wherein the first bolt extends from the pressure relief valve to the valve side.

12. The method of claim 8 wherein the tank is a rail car tank.

13. The method of claim 8 wherein the tank is an ISO tank.

14. The method of claim 8 wherein the tank is a tote tank.

15. The method of claim 8 further comprising disposing the pressure control valve and rupture disc within a valve cover assembly.

* * * * *